United States Patent Office 2,727,013
Patented Dec. 13, 1955

2,727,013

VINYL CHLORIDE POLYMERS PLASTICIZED WITH DIALKYL ESTERS OF ALPHA ARYL GLUTARIC ACIDS

Raymond I. Longley, Jr., Springfield, Mass., assignor to Monsanto Chemical Company, St. Louis, Mo., a corporation of Delaware No Drawing. Application April 27, 1953,
Serial No. 351,498

3 Claims. (Cl. 260—31.8)

This invention relates to plasticized vinyl chloride resins. More particularly the invention relates to a new class of plasticizers for vinyl chloride resins.

Polymers of vinyl chloride and copolymers thereof with vinylidene chloride or vinyl acetate are rather stiff materials which are difficult to work in their unplasticized state. Among the major difficulties is the breakdown of the resins at the relatively high temperatures necessary to work the unplasticized materials.

One object of this invention is to plasticize thermoplastic resins derived from vinyl chloride.

A further object of this invention is to plasticize homopolymers of vinyl chloride and copolymers thereof with vinylidene chloride or vinyl acetate in which copolymers the vinyl chloride constitutes at least 50 mol percent of the copolymer.

Another object of this invention is to provide new plasticizers for vinyl chloride polymers and copolymers.

These and other objects are attained by incorporating into vinyl chloride polymers and copolymers a plasticizing amount of certain dialkyl esters of alpha aryl glutaric acids.

The following examples are given in illustration and are not intended as limitations on the scope of this invention. Where parts are mentioned they are parts by weight.

*Example I*

Mix 100 parts of a homopolymer of vinyl chloride having a molecular weight of about 60,000 with 40 parts of the di-(2-ethylhexyl) ester of alpha phenyl glutaric acid. Mill the mixture on heated milling rolls until it becomes homogeneous. Then mold the homogeneous mass into a disc by compression molding at 200° C. and 1500 p. s. i. pressure. The disc is clear and slightly yellow. It maintains good flexibility at temperatures as low as −40° C. There is substantially no discoloration during the molding operation.

If a diester prepared from a mixture of nonyl alcohols is used to replace the 2-ethylhexyl ester of Example I, the molded material will be slightly more flexible at the same concentration of plasticizer.

*Example II*

Blend 100 parts of a pulverulent homopolymer of vinyl chloride with 100 parts of the di-(2-ethylhexyl) ester of alpha phenyl glutaric acid until the plasticizer is thoroughly distributed throughout the resin mass. Mill the blend on hot milling rolls and then calender the milled material into sheets 0.020″ thick. The material will process without difficulty and a smooth flexible and soft sheet will be obtained. The sheet is substantially colorless and clear.

*Example III*

Blend 100 parts of a copolymer of vinyl acetate and vinyl chloride in which the vinyl chloride constitutes 85% of the copolymer, with 30 parts of di-(2-ethylhexyl) alpha phenyl glutarate and then extrude the blend through a heated worm-type extruder into a 0.020″ ribbon. The ribbon is clear and substantially colorless indicating substantially no decomposition of the resin during the processing step.

*Example IV*

Blend 100 parts of a copolymer of vinyl chloride and vinylidene chloride in which the vinyl chloride constitutes 85% by weight of the copolymer, with 50 parts of di-(2-ethylhexyl) alpha phenyl glutarate. Extrude the blend into a ribbon using a worm-type extruder. The ribbon is softer than that prepared in Example III and it is clear and substantially colorless.

The polymers and copolymers of this invention are polymers of vinyl chloride and copolymers thereof with vinyl acetate or vinylidene chloride in which the vinyl chloride constitutes at least 50 mol percent of the copolymer. The molecular weights of these polymers and copolymers for the purposes of this invention range from about 50,000 to about 100,000 as measured by the Staudinger method.

The plasticizers of this invention are dialkyl esters of alpha aryl glutaric acids having the following formula

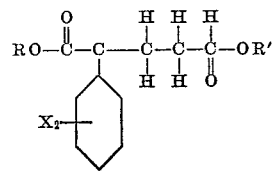

wherein R and R′ are saturated aliphatic groups containing from 7–9 carbon atoms and X is hydrogen, methyl or ethyl. R and R′ may represent the same or different groups. Among the operable diesters are the di n-heptyl, di n-octyl, di n-nonyl, di 2-ethyl hexyl, di 2-methyl octyl, etc. esters of alpha phenyl, alpha tolyl, alpha xenyl, alpha p-ethyl phenyl, alpha diethyl phenyl etc. glutaric acids.

The esters of this invention may be prepared by reacting an alcohol or mixture of alcohols with the anhydride of the desired alpha aryl glutaric acid. The reaction is conveniently carried out in an aqueous medium at reflux temperature and atmospheric pressure using an excess of the alcohol or mixture of alcohols and sulfuric acid as a catalyst.

For compatibility with the polymers and copolymers of this invention the alkyl groups should be saturated and unsubstituted but they may be straight chain or branch chain groups. The alkyl groups should contain from 7–9 carbon atoms. A mixture of straight and branched chain alcohols may be used in the esterification step resulting in mixed esters of the alpha aryl glutaric acid. The esters are substantially colorless liquids having a refractive index of about 1.47.

The amount of ester used will vary from 1 to 125 parts by weight based on 100 parts of the resin depending on the resin and the amount of softening required. Thus for the copolymers containing relatively large amounts of vinyl acetate or vinylidene chloride, from 1 to 15 parts of ester is all that is needed to obtain substantial softening. For preparing rigid sheeting or wire coverings from the vinyl chloride homopolymer, as little as 5 parts of the ester will overcome the major processing difficulties without softening the resin beyond the desired limits. On the other hand when very soft flexible sheeting is required as much as 125 parts of the ester may be used for 100 parts of the resin without substantial leaking or exudation of the ester from the composition.

The esters of this invention increase the workability of the resin so that it becomes easier to incorporate conventional additives such as dyes, pigments, fillers, lubricants, stabilizers etc. to the resin compositions without danger of decomposition of the resin.

The esters of this invention are particularly useful in view of their compatibility with the vinyl chloride polymers and copolymers over a wide range. They impart low temperature flexibility to the resins and are substantially non-volatile therefrom. Furthermore, they do not impart color to the resins nor cause decomposition thereof during standard processing operations.

What is claimed is:

1. A composition of matter comprising 100 parts of a homopolymer of vinyl chloride plasticized with 40 parts of the di-(2-ethylhexyl) ester of alpha phenyl glutaric acid.

2. A composition of matter comprising a thermoplastic resin taken from the group consisting of homopolymers of vinyl chloride and copolymers of vinyl chloride and a compound taken from the group consisting of vinylidene chloride and vinyl acetate, the vinyl chloride in said copolymer constituting at least 50 mol percent thereof, said thermoplastic resin being plasticized with a dialkyl ester of an alpha aryl glutaric acid taken from the group consisting of alpha phenyl, alpha tolyl, alpha xenyl, alpha p-ethyl phenyl and alpha diethyl phenyl glutaric acids, the alkyl groups of said esters containing from 7–9 carbon atoms.

3. A composition of matter as in claim 2 wherein the thermoplastic resin is a homopolymer of vinyl chloride.

References Cited in the file of this patent

UNITED STATES PATENTS

| | | |
|---|---|---|
| 1,949,093 | Van Schaak | Feb. 27, 1934 |
| 2,498,453 | Schaerer et al. | Feb. 21, 1950 |